United States Patent [19]

Hazarie et al.

[11] Patent Number: 5,391,071

[45] Date of Patent: Feb. 21, 1995

[54] APPARATUS AND METHOD FOR INSPECTING AND CLEANING LIPS OF CASTINGS DIE

[75] Inventors: Roopnarine Hazarie, Rochester; Edward S. Jones, East Rochester; Timothy R. Mahns; Vratislav M. Michal, both of Rochester; Scott C. Ofslager, Albion, all of N.Y.

[73] Assignee: Eastman Kodak Company, Rochester, N.Y.

[21] Appl. No.: 146,263

[22] Filed: Oct. 29, 1993

[51] Int. Cl.⁶ .................... B29C 47/14; B29C 47/92
[52] U.S. Cl. ........................ 425/135; 264/39; 264/40.1; 425/223; 425/224; 425/227; 425/229
[58] Field of Search ............... 425/225, 227, 229, 135, 425/461, 223, 224; 264/40.1, 39

[56] References Cited

U.S. PATENT DOCUMENTS

| | | | |
|---|---|---|---|
| 4,255,109 | 3/1981 | Emmerich et al. | 425/277 |
| 4,670,202 | 6/1987 | Uenoyama et al. | 264/39 |
| 5,188,788 | 2/1993 | Suzuki et al. | 264/39 |

FOREIGN PATENT DOCUMENTS

| | | | |
|---|---|---|---|
| 215590 | 11/1984 | German Dem. Rep. | 425/225 |
| 61-148016 | 7/1986 | Japan | 425/227 |
| 4-86222 | 3/1992 | Japan | 425/225 |

*Primary Examiner*—Khanh Nguyen
*Attorney, Agent, or Firm*—Charles E. Snee, III

[57] ABSTRACT

Apparatus is disclosed for producing thin polymeric film and includes a source (17) of a solution of polymer and solvent; a casting member (10) having an outer surface (12) for receiving a cast layer (18) of polymer and solvent, the layer having a transverse width; a casting die (16) for casting the layer of polymer and solvent onto the outer surface, the die including a transverse slot (20) with adjacent upstream and downstream lips (22, 24) between which the polymer and solvent flow during casting, the lips having lengths approximating the transverse width of the layer; and a device (11) for moving the outer surface past the casting die. Improved devices are provided for optically inspecting (26, 32) the lips to detect a presence of agglomerations of polymer on the lips; for directing a stream of solvent (28, 34) at the lip to wash away any detected agglomeration; for supporting (58, 116) the device for inspecting and the device for directing; and for traversing (44, 48, 52, 64; 90, 96, 106, 120) the device for supporting back and forth along the length of the lip to facilitate inspecting and washing of the lip.

8 Claims, 8 Drawing Sheets

APPARATUS AND METHOD FOR INSPECTING AND CLEANING LIPS OF CASTINGS DIE

TECHNICAL FIELD

The invention concerns apparatus and methods for making thin films of polymeric material such as cellulose acetate. More particularly, the invention concerns apparatus and a method for washing agglomerations of polymer from the lips of a casting die used to produce such films, to reduce irregularities in the film caused by such agglomerations.

BACKGROUND ART

Thin films for a variety of purposes for many years have been made by casting a layer of polymer and solvent onto a moving casting support member such as a drum or endless belt or band. The solvent evaporates from the layer while the layer moves through dryer zones on the casting support member, until the layer is sufficiently dry to be self supporting, whereupon the layer is removed from the casting support member. Casting is achieved in the familiar manner by forcing a dope of solvent and polymer through a narrow slot in a casting hopper or die which extends substantially across the width of the casting support member. As the dope flows through the slot, small globules or agglomerations sometimes tend to form along the lips adjacent the slot, due to tiny inclusions in the dope which stick to the lips, to irregularities in the ambient conditions at the lip and to complex combinations of such and other conditions. The presence of such globules or agglomerations can cause elongated irregularities to form in the cast layer as the layer moves from the slot to the casting support member. Such irregularities may not settle or dissipate as the cast layer dries, leading to a product film with surface irregularities which render it useless for various applications, such as the manufacture of photographic film.

One known technique for reducing such irregularities is to visually inspect the cast layer through windows in the film forming apparatus, before the cast layer leaves the casting support member or after the cast layer has been stripped from the casting support member, to detect the presence of any irregularities which may have been caused by such globules or agglomerations. The film forming apparatus is then stopped and its gas tight casing is opened to permit an operator to directly observe the lips of the casting hopper and wipe off any agglomerations using a solvent soaked swab, for example. Not only does this slow the production of the thin film, but also it exposes the operator to solvent vapors which may be harmful or explosive or both.

A need has existed for an apparatus and method for detecting and removing agglomerations from the lips of a casting die, without requiring that the foam forming apparatus be stopped or that the casing of the apparatus be opened with attendant release of solvent vapors.

SUMMARY OF THE INVENTION

The invention is defined in the appended claims. In one embodiment, the apparatus is of the type including a source of a solution of polymer and solvent; a casting member having an outer surface for receiving a cast layer of polymer and solvent, the layer having a transverse width; a casting die for casting the layer of polymer and solvent onto the outer surface, the die comprising a transverse slot with adjacent upstream and downstream lips between which the polymer and solvent flow during casting, the lips having lengths approximating the transverse width of the layer; and means for moving the outer surface past the casting die. The improvement of the invention includes means for optically inspecting at least one of the lips to detect a presence of agglomerations of polymer on the lip; means for directing a stream of solvent at the lip to wash away any detected agglomeration while casting continues; means for supporting the means for inspecting and the means for directing; and means for traversing the means for supporting back and forth along the length of the lip while casting continues to facilitate inspecting and washing of the lip during casting of the layer.

Means may be included for detecting the position of the means for supporting during traversing. Preferably, the means for optically inspecting comprises a fiber optic scope aimed at the lip; and the means for directing a stream of solvent comprises a tubular nozzle aimed at a location on the lip viewed simultaneously by the fiber optic scope. At the upstream lip, the means for traversing may comprise a raft extended parallel to the lip, the means for supporting being slidably mounted on the raft; a drive pulley mounted near one end of the rail; a driven pulley mounted near another end of the rail; a cable extended around the drive and driven pulleys and attached to the means for supporting; and means for rotating the drive pulley to move the means for supporting along the rail. To provide reduced gas pressure at the upstream lip, the apparatus also may include a housing enclosing the means for traversing and the means for supporting, the housing being mounted to the casing of the overall apparatus; an elongated slot extended through the casing parallel to the lip, the means for optically inspecting and the means for directing being extended through the elongated slot into the casing; and means for withdrawing gas from the housing and, via the elongated slot, from the casing, to produce reduced gas pressure at the upstream lip.

At the downstream lip, the means for traversing may comprise a rail extended parallel to the lip, the means for supporting being slidably mounted on the rail; a drive pulley mounted near one end of the rail; a driven pulley mounted near another end of the rail; a belt extended around the drive and driven pulleys and attached to the means for supporting; and means for rotating the drive pulley to move the means for supporting along the rail. A housing enclosing the drive pulley, driven pulley and belt may be included, the housing being mounted to the casing of the overall apparatus. A first elongated slot extends through the casing parallel to the lip, the means for optically inspecting and the means for directing being extended from the housing through the first elongated slot into the casing. A second elongated slot extends through the housing parallel to the lip, the means for optically inspecting and the means for directing being extended from the means for supporting through the second elongated slot into the housing. Preferably, edge seals or guides are provided for engaging opposite edges of the belt along the second elongated slot, to reduce gas flow through the second elongated slot.

The method of the invention is of the type including the steps of providing a source of a solution of polymer and solvent; providing a casting member having an outer surface for receiving a cast layer of polymer and solvent, the layer having a transverse width; providing a casting die for casting the layer of polymer and solvent onto the outer surface, the die comprising a transverse slot with adjacent upstream and downstream lips between which the polymer and solvent flow during casting, the lips having lengths approximating the transverse width of the layer; and moving the outer surface past the casting die while casting the layer onto the outer surface. The improvement of the invention comprises the further steps, while casting of the layer continues, of providing means for optically inspecting at least one of the lips to detect a presence of agglomerations of polymer on the lip; providing means for directing a stream of solvent at the lip to wash away any detected agglomeration; traversing the means for means for inspecting and directing along the length of the lip to facilitate inspecting of the lip; stopping the means for inspecting and directing upon detection of an agglomeration; directing a stream of solvent at the detected agglomeration to wash it away; and repeating the traversing, stopping and directing steps along the length of the lip.

The apparatus and method of the invention provide simple and effective techniques for removing unwanted agglomerations of polymer from the lips of a casting die, without making it necessary to stop the casting process or to open the casing of the apparatus and release potentially dangerous solvent vapors. On the upstream side of the die, vacuum may be drawn through the apparatus of the invention to help ensure proper engagement of the cast layer with the casting support member. On the downstream side of the die, gas flow from the casing is minimized due to a moving seal formed between the drive belt and its housing.

BRIEF DESCRIPTION OF THE DRAWINGS

The foregoing and other objectives, features and advantages of the invention will be apparent from the following more particular description of the preferred embodiments of the invention, as illustrated in the accompanying drawings.

DESCRIPTION OF THE PREFERRED EMBODIMENTS

Figure 1:
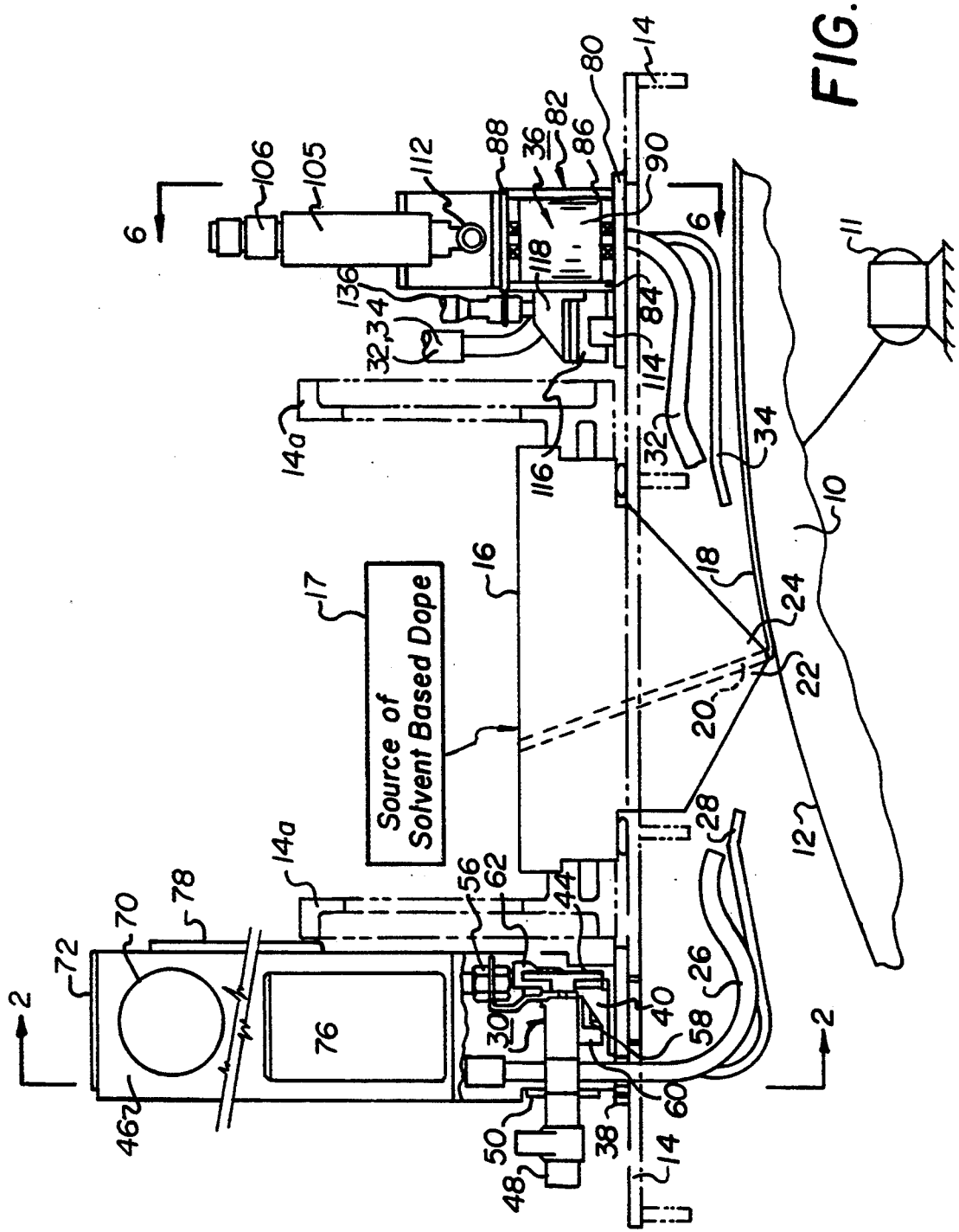
FIG. 1 shows a side elevation view, partially in section and partially fragmentary, of the apparatus of the invention.
Figure 2:
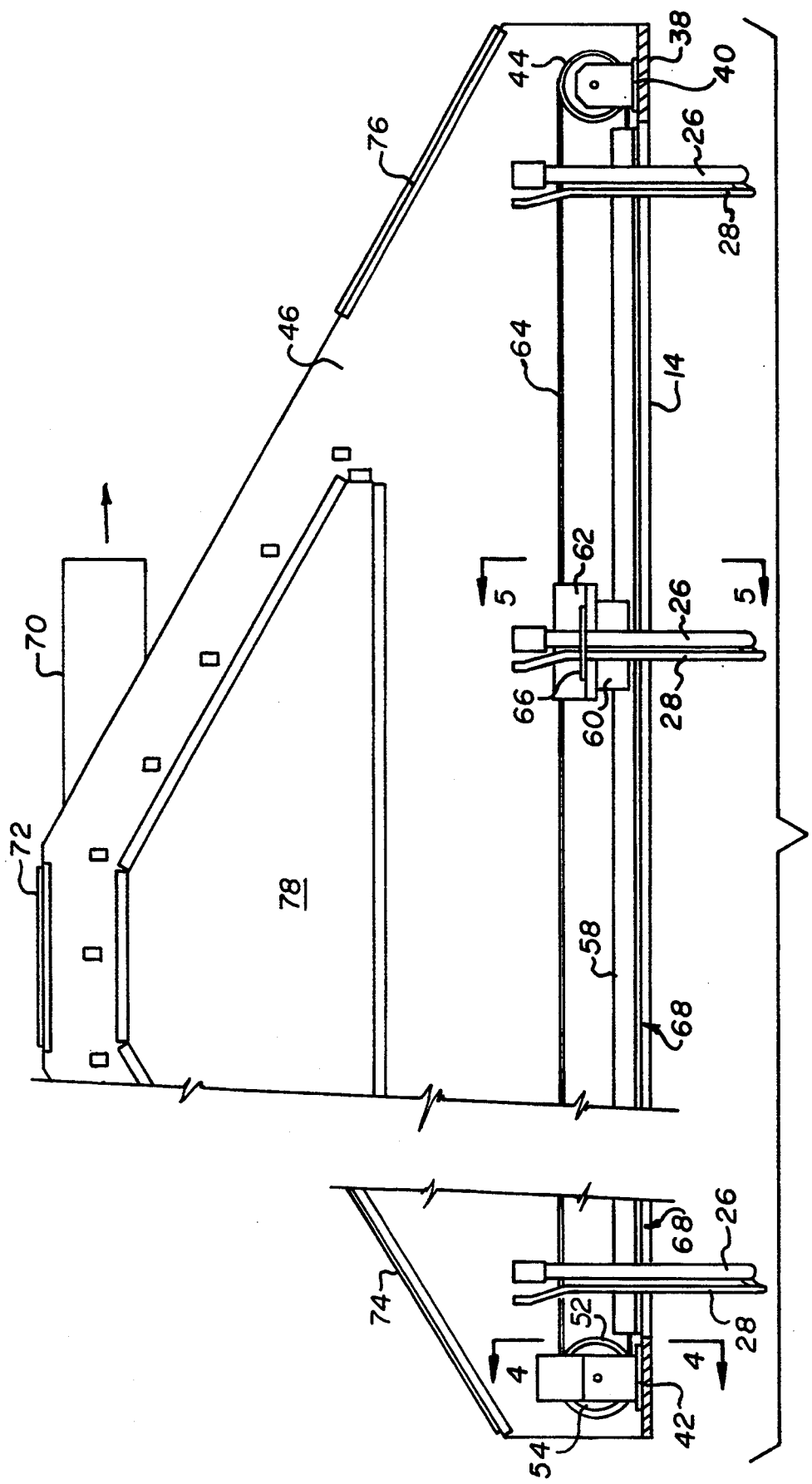
FIG. 2 shows a front elevation view, partially fragmentary, taken along line 2—2 of FIG. 1, the inspection scope and solvent nozzle being shown in three positions along the length of the apparatus.

The following is a detailed description of the preferred embodiments of the invention, reference being made to the drawings in which the same reference numerals identify the same elements of structure in each of the several Figures.

Overall Arrangement and Operation

As shown schematically in FIG. 1, an apparatus for producing a thin polymeric film may comprise a casting support member 10 such as a drum or endless belt having a transverse width or axial length in the range of 6 to 7 feet (1.83 to 21.3 m), for example. Means such as a motor 11 are provided for moving or rotating support member 10. The drum or belt has a polished exterior surface 12 onto which a layer of solvent based dope is cast in the conventional manner. A suitable gas tight casing or frame 14 surrounds support member 10 and supports a conventional casting hopper or die 16 on rails 14a which extend across the transverse width of the casting support member. A source 17 of solvent based dope communicates with die 16 which extrudes onto surface 12 a very thin layer 18 of dope. In the conventional manner, die 16 comprises a long slot 20 which extends substantially across the transverse width of support member 10 and is defined by transverse upstream and downstream lips 22, 24. It is on lips 22, 24 that the agglomerations previously discussed tend to form.

To remove such agglomerations in accordance with our invention, an upstream fiber optic scope 26 and an upstream solvent nozzle 28 are supported near upstream lip 22 by a means 30 which can traverse scope 26 and nozzle 28 back and forth along the transverse width of the lip. Scope 26 is aimed at lip 26; so that, the lip appears at about the center of the scope's field of view. Nozzle 28 is aimed at the same location viewed by the scope. Scope 26 is of conventional, commercially available design and preferably is connected by a suitable flexible fiber optic cable to a video camera and monitor, not illustrated, to provide an operator with a ready view of lip 22. If desired, a linear scale may be attached to or etched upon or near the lips, as an aid to determine the position of the scope and nozzle. Nozzle 28 is made from plain metal tubing having an inner diameter in the range of 0.090 to 0.120 inch (2.27 to 3.05 mm) and having at its outlet or tip end a discharge nozzle insert, not illustrated, having an inner diameter in the range of 0.020 to 0.040 inch (0.51 to 1.02 mm). Preferably nozzle 28 is connected by a suitable flexible conduit to an inert gas- or nitrogen-pressurized source of solvent, not illustrated, via a suitable control valve, also not illustrated. For a dope comprising cellulose acetate and methylene chloride, for example, a solvent comprising essentially methylene chloride may be subjected to an over pressure in the range of 5.0 to 10.0 psi (34.48 to 68.95 kPa) to provide a suitable stream of solvent through nozzle 28. Similarly, a downstream fiber optic scope 32 and a downstream solvent nozzle 34 are supported near downstream lip 24 by a means 36 which can traverse scope 32 and nozzle 34 back and forth across the transverse width of the lip.

In operation of the apparatus, support means 30 and 36 are actuated in the manner to be described subsequently in this specification, to traverse their respective scopes and nozzles to locations along the transverse width of their respective lips where unwanted agglomerations are observed optically through the scopes. Without stopping the casting of layer 18 onto support member 10, streams of solvent are directed from the nozzles toward the agglomerations until they are dissolved or washed away or both. The scopes and nozzles on each side of the die may be operated independently. The film made during removal of such agglomerations in most cases subsequently must be discarded; however, once the removal is complete, acceptable film again is cast onto the support member. The presence of agglomerations may be determined by periodically traversing the scopes to inspect the entire lengths of the upstream and downstream lips. Alteratively, such presence may be inferred by visual inspection of layer 18 as it moves with support member 10, after which the nozzles may be moved to the likely locations of such agglomerations.

Upstream Scope and Nozzle

Figure 3:
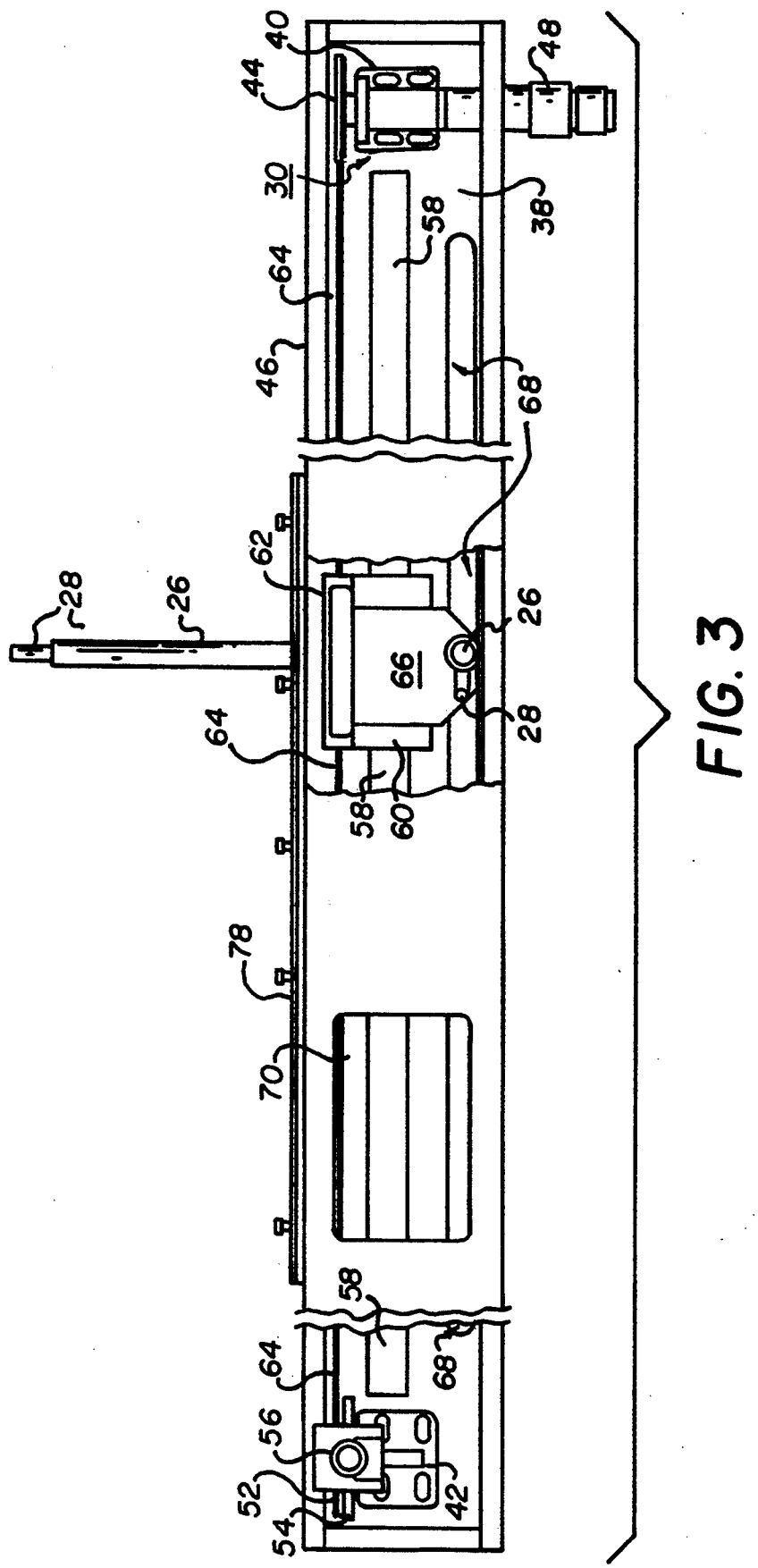
FIG. 3 shows a top view, partially broken away and partially fragmentary, of the apparatus of FIG. 2.
Figure 4:
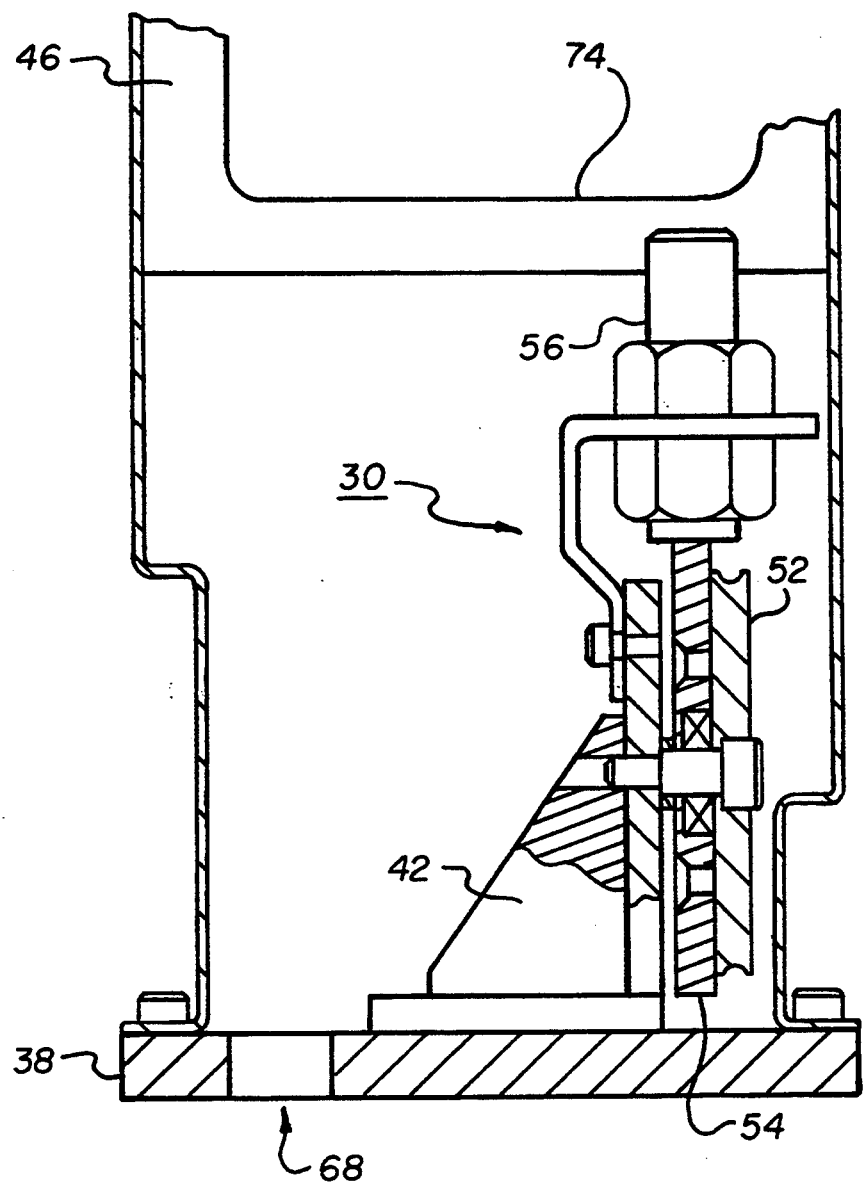
FIG. 4 shows a view taken along line 4—4 of FIG. 2.
Figure 5:
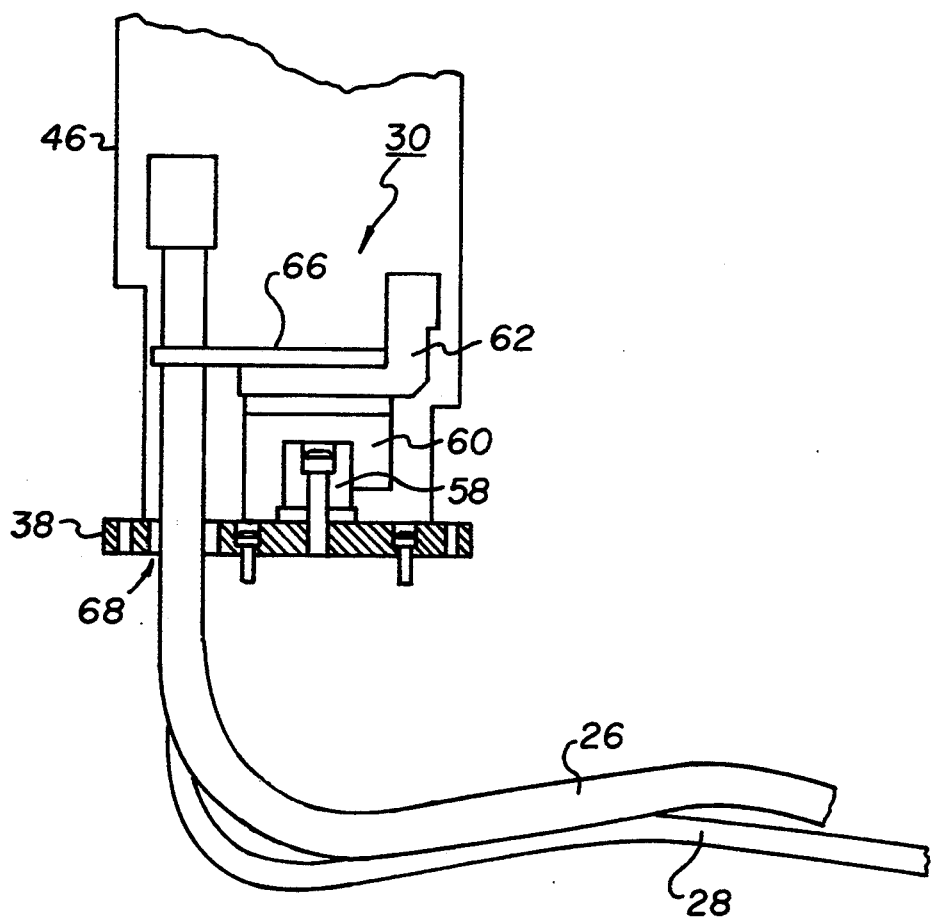
FIG. 5 shows a view taken along line 5—5 of FIG. 2.

Referring simultaneously to FIGS. 1 to 5, the mounting and operation of the upstream scope and nozzle may be understood. A mounting plate 38 is attached to casing 14 and extends parallel to and across the transverse width of support member 10. Mounted on and extended upward from plate 38 at opposite ends thereof are a drive pulley support bracket 40 and a driven pulley support bracket 42. A drive pulley 44 is supported on bracket 40. An essentially trapezoidal shaped, gas tight housing 46 is supported on and extended upward from plate 38. Support bracket 40 also supports a conventional gas driven motor 48 which extends through housing 46 at a seal plate 50, motor 48 being operatively connected to pulley 44. Bracket 42 rotatably supports a driven pulley 52 and on the same shaft a magnetic encoder disk 54 which actuates a Hall effect sensor 56 positioned above the disk, as seen in FIGS. 3 and 4. Thus, the output from sensor 56 may be used to determine the position of means 30 along the transverse width of upstream lip 22. Extended between brackets 40, 42 on support plate 38 is a conventional slide or rail 58 which supports a conventional slider or carriage 60. Affixed to carriage 60 is a cable attachment bracket 62 to which the ends of a stainless steel cable 64 are attached, cable 64 being extended around pulleys 44, 52. One or both ends of cable 64 may be secured to bracket 62 by a suitable spring tensioner, not illustrated. Those skilled in the art will appreciate that other means, such as a motor driven lead screw, may be used to move carriage 60, without departing from the scope of the invention. Also affixed to carriage 60 is a transverse support bracket for scope 26 and nozzle 28. Mounting plate 38 is provided with an elongated through slot 68 which extends parallel to and along the transverse width of upstream lip 22. Slot 68 communicates with a volume upstream of die 16 in which a reduced pressure preferably is maintained to assist layer 18 properly to engage exterior surface 12. To provide such a reduced pressure, housing 46 includes near its upper end an outlet conduit 70 which may be connected to a suitable vacuum source, not illustrated. To provide access to the interior of housing 46, there may be provided an upper access port 72, end access ports 74, 76 and a side access port 78, of conventional designs. The flexible conduits for nozzles 28, 34 and the optic cables for scopes 26, 32 may be passed through access port 72, using conventional gas tight bulkhead fittings, for example.

Downstream Scope and Nozzle

Figure 6:
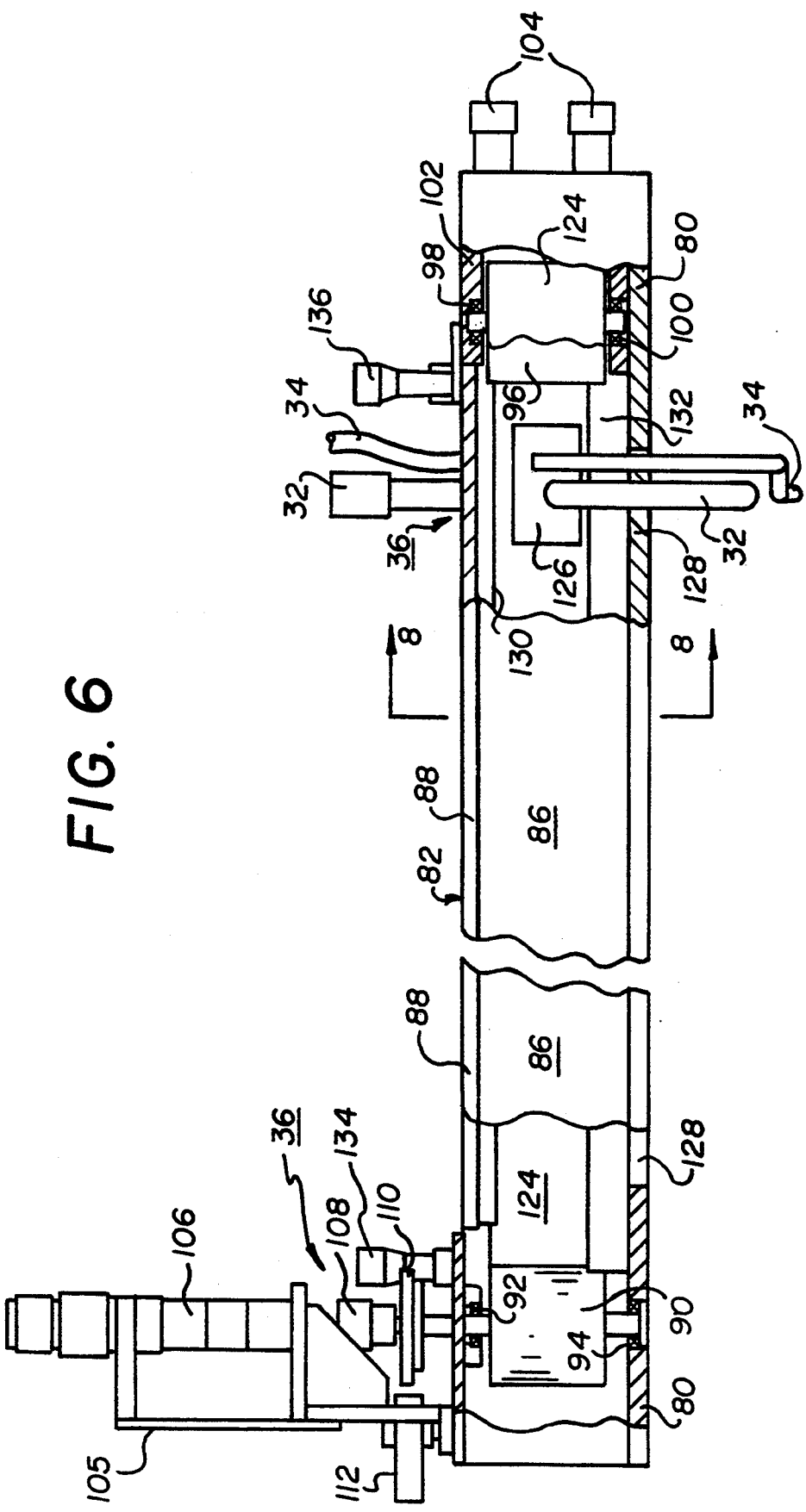
FIG. 6 shows a front elevation view, partially broken away and partially fragmentary, taken along line 6—6 of FIG. 1.
Figure 7:
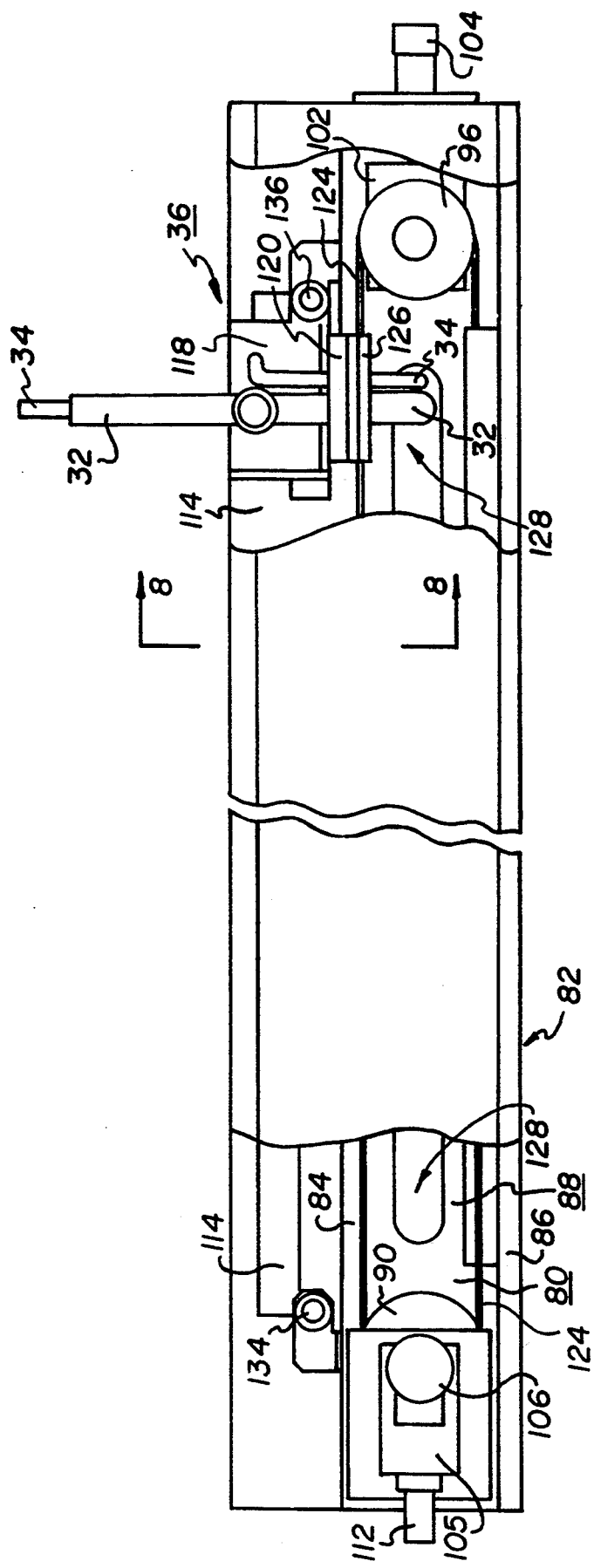
FIG. 7 shows a top view, partially broken away and partially fragmentary, of the apparatus of FIG. 6.
Figure 8:
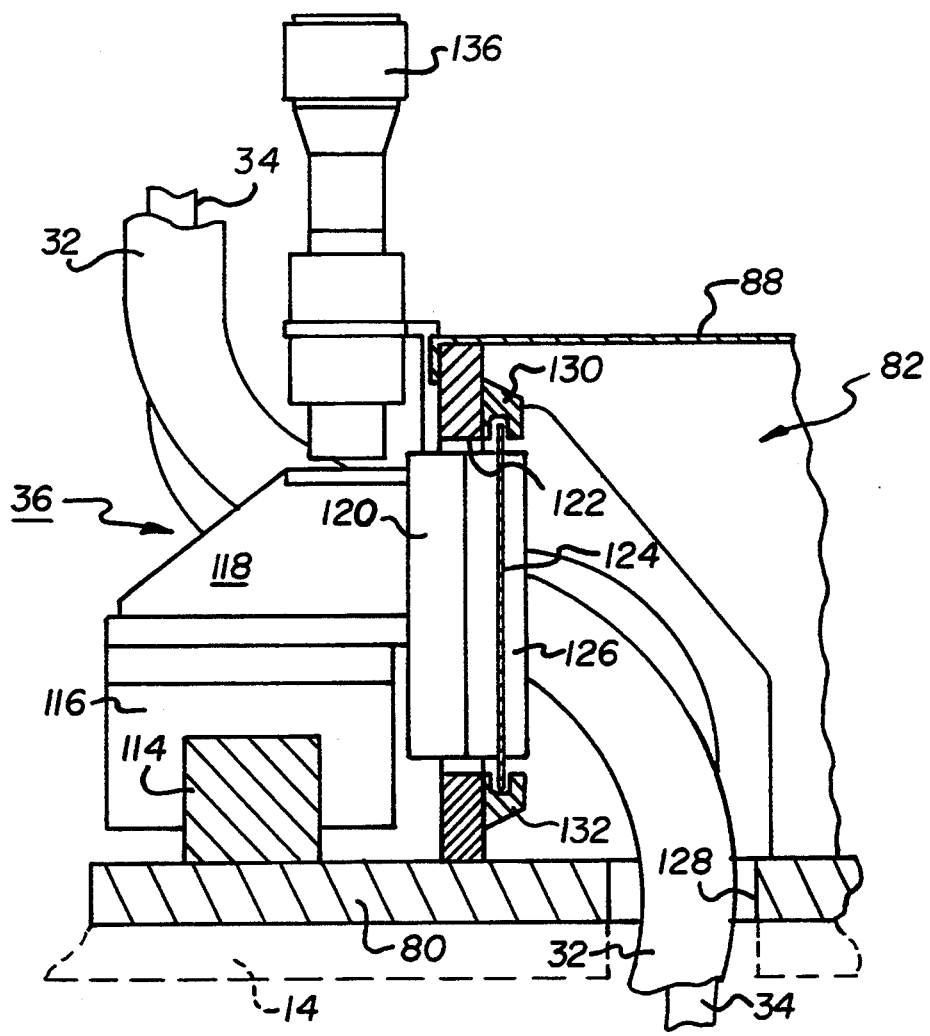
FIG. 8 shows a view taken along line 8—8 of FIGS. 6 and 7.

Referring simultaneously to FIGS. 1 and 6 to 8, the mounting and operation of the downstream scope and nozzle may be understood. A mounting plate 80 is attached to casing 14 and extends parallel to and across the transverse width of support member 10. An elongated housing 82 extends upwardly from mounting plate 80 and comprises an upstream wall 84, a downstream wall 86, a top wall 88 and suitable end walls. Within housing 82 at one end of mounting plate 80, a drive pulley 90 having a vertically oriented axis is mounted for rotation in a pair of bearings 92, 94. At the opposite end of mounting plate 90, a driven pulley 96 having a vertically oriented axis is mounted for rotation in a pair of bearings 98, 100, the bearings being supported in a floating pulley bracket 102. Floating bracket 102 preferably is connected to the adjacent end wall by a pair of adjustable spring screws 104. Above drive pulley 90, a bracket 105 is attached to housing 82 and supports a gas driven motor 106 which is operatively connected to drive pulley 90 via a suitable coupling 108. Also mounted for rotation with pulley 90 is a magnetic encoder disk 110 which actuates a Hall effect sensor 112 positioned adjacent the disk on bracket 105, as seen in FIGS. 6 and 7. Thus, the output from sensor 112 may be used to determine the position of means 36 along the transverse width of downstream lip 24. Extended between pulleys 90, 96 outside of housing 82 and attached to mounting plate 80 is a conventional slide or rail 114 which supports a conventional slider or carriage 116. A horizontal support bracket 118 extends from carriage 116 toward housing 82 and supports a vertical belt engagement plate 120 which extends into an elongated slot 122 in upstream wall 84. A stainless steel belt 124 is wrapped around pulleys 90, 96 and has its ends captured between engagement plate 120 and a backing plate 126. The tension in belt 124 may be adjusted using spring screws 104. Scope 32 and nozzle 34 extend snugly through plates 120, 126 and then pass downwardly through an elongated slot 128 in mounting plate 80 and into casing 14, as seen best in FIGS. 1 and 8. To minimize flow of gas from the interior of casing 14 through housing 82, the edges of belt 124 extend beyond plates 120, 126 into engagement with elongated edge seals or guides 130, 132 which extend along the upper and lower edges of slot 122, respectively. Finally, a pair of magnetic sensors 134, 136 may be mounted at opposite ends of slide 114 to detect the presence of slider 116 at the end of its travel.

While our invention has been shown and described with reference to particular embodiments thereof, those skilled in the art will understand that other variations in form and detail may be made without departing from the scope and spirit of our invention.

Having thus described our invention in sufficient detail to enable those skilled in the art to make and use it, we claim as new and desire to secure Letters Patent for:

1. In an apparatus for producing thin polymeric film, the apparatus including a source of a solution of polymer and solvent; a casting member having an outer surface for receiving a cast layer of polymer and solvent, the layer having a transverse width; a casting die for casting the layer of polymer and solvent onto the outer surface, the die comprising a transverse slot with adjacent upstream and downstream lips between which the polymer and solvent flow during casting, the lips having lengths approximating the transverse width of the layer; and means for moving the outer surface past the casting die, the improvement comprising:

means for optically inspecting at least one of the lips to detect a presence of agglomerations of polymer on the lip;

means for directing a stream of solvent at the lip to wash away any detected agglomeration;

mean for supporting the means for inspecting and the means for directing; and means for traversing the means for supporting back and forth along the length of the lip to facilitate inspecting and washing of the lip.

2. The improvement of claim 1, further comprising means for detecting the position of the means for supporting during traversing.

3. The improvement of claim 1, wherein the means for optically inspecting comprises a fiber optic scope aimed at the lip.

4. The improvement of claim 3, wherein the means for directing a stream of solvent comprises a tubular nozzle aimed at a location on the lip viewed simultaneously by the fiber optic scope.

5. The improvement of claim 1, wherein the at least one lip is the upstream lip and the means for traversing comprises a rail extended parallel to the lip, the means for supporting being slidably mounted on the rail; a drive pulley mounted near one end of the rail; a driven pulley mounted near another end of the rail; a cable extended around the drive and driven pulleys and attached to the means for supporting; and means for rotating the drive pulley to move the means for supporting along the rail.

6. The improvement of claim 5, wherein the casting member is enclosed within a casing, further comprising:

a housing enclosing the means for traversing and the means for supporting, the housing being mounted to the casing;

an elongated slot extended through the casing parallel to the lip, the means for optically inspecting and the means for directing being extended through the elongated slot into the casing; and means for withdrawing gas from the housing and, via the elongated slot, from the casing, to produce reduced gas pressure at the upstream lip.

7. The improvement of claim 1, wherein the at least one lip is the downstream lip and the means for traversing comprises a rail extended parallel to the lip, the means for supporting being slidably mounted on the rail; a drive pulley mounted near one end of the rail; a driven pulley mounted near another end of the rail; a belt extended around the drive and driven pulleys and attached to the means for supporting; and means for rotating the drive pulley to move the means for supporting along the rail.

8. The improvement of claim 7, wherein the casting member is enclosed within a casing, further comprising:

a housing enclosing the drive pulley, driven pulley and belt, the housing being mounted to the casing;

a first elongated slot extended through the casing parallel to the lip, the means for optically inspecting and the means for directing being extended from the housing through the first elongated slot into the casing;

a second elongated slot extended through the housing parallel to the lip, the means for optically inspecting and the means for directing being extended from the means for supporting through the second elongated slot into the housing; and edge guides engaging opposite edges of the belt along the second elongated slot to reduce gas flow through the second elongated slot.

* * * * *